United States Patent [19]

Baker et al.

[11] Patent Number: 4,525,538

[45] Date of Patent: Jun. 25, 1985

[54] POLYMERIZING MONOMER IN PRESENCE OF POLYMER CONTAINING ELECTROPHILIC MOIETY USING ZIEGLER-NATTA CATALYST

[75] Inventors: Gregory L. Baker, Bridgewater; Frank S. Bates, Berkeley Heights, both of N.J.

[73] Assignee: AT&T Bell Laboratories, Murray Hill, N.J.

[21] Appl. No.: 485,856

[22] Filed: Apr. 18, 1983

[51] Int. Cl.³ .................................... C08F 279/02
[52] U.S. Cl. .................... 525/275; 525/247; 525/315; 525/529; 428/462
[58] Field of Search ............... 525/247, 275, 529, 315

[56]      References Cited
        U.S. PATENT DOCUMENTS

| | | | |
|---|---|---|---|
| 2,985,617 | 5/1961 | Salyer et al. | 524/140 |
| 3,458,598 | 7/1969 | Craven | 525/247 |
| 3,957,910 | 5/1976 | van den Berg | 525/247 |
| 4,394,304 | 7/1983 | Wnek | 525/247 |
| 4,482,671 | 11/1984 | Woo et al. | 523/404 |

FOREIGN PATENT DOCUMENTS 1527043  4/1968  France ..................... 525/529

Primary Examiner—Wilbert J. Briggs, Sr.
Attorney, Agent, or Firm—Bruce S. Schneider

[57] ABSTRACT

Graft polymers such as grafted polyacetylene and devices based on derivatives of these polymers are produced utilizing a specific process. The process includes the steps of polymerizing a monomer such as acetylene in the presence of a host polymer such as polyisoprene to produce a graft polymer. The use of a host polymer yields several desirable results. For example, when the graft polymerization is performed in the presence of a solvent for an appropriate host polymer, the entire graft polymer is solvated. The solvated graft polymer is then employable to produce films of polymers on a substrate which are in turn useful in structures such as devices.

10 Claims, 1 Drawing Figure

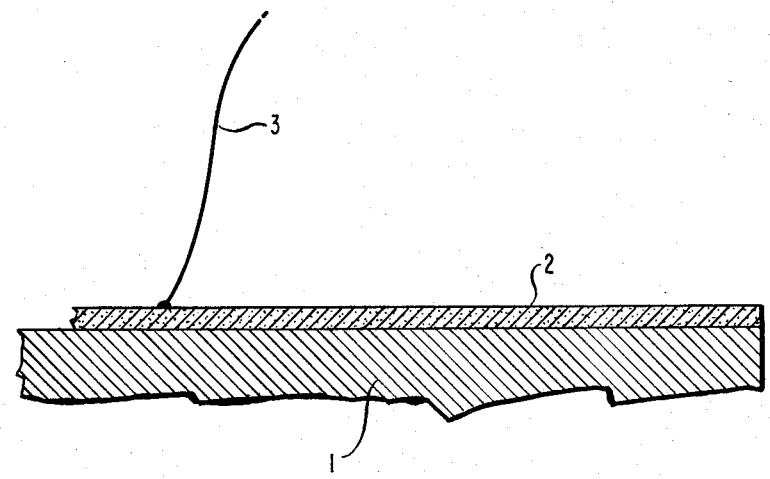

POLYMERIZING MONOMER IN PRESENCE OF POLYMER CONTAINING ELECTROPHILIC MOIETY USING ZIEGLER-NATTA CATALYST

BACKGROUND OF THE INVENTION

1. Field of the Invention

This invention relates to polymerization processes and, in particular, to polymerization processes involving graft polymerization.

2. Art Background

Ziegler-Natta catalysis has been used extensively for producing many commercially significant polymers. Basically Ziegler-Natta catalysis involves the polymerization of an unsaturated monomer, e.g., an olefinic monomer, by the use of a Ziegler-Natta catalyst system including an organometallic such as an aluminum alkyl and a transition metal salt. (See, for example, John Boor, Jr., *Ziegler-Natta Cataysis and Polymerizations*, New York: Academic Press, 1979.)

Although many commercially viable polymers have been produced utilizing Ziegler-Natta catalysis, other polymers have engendered interest but have not exhibited all the properties desirable for a practical material. For example, acetylene and substituted acetylenes have been polymerized into polyacetylenes with a variety of catalyst systems. (See Boor supra, 540–543.) However, polyacetylene, the most significant of this class of polymers obtained through this polymerization, is essentially not soluble in any typical solvent. The insolubility of the polymer makes fabrication of devices such as solar cells utilizing this polyacetylene quite arduous. (See Weinberger et al, *Applied Physics Letters*, 38(7), 555 (1981) for a description of the fabrication procedure.) The polymer insolubility also severely limits control over the properties of the polyacetylene material ultimately used in devices. For example, there is essentially no control over the thickness and density of a polyacetylene layer formed as a component of a device such as a solar cell and no control over the interface between this polyacetylene component and the physically contacting components. Thus, even though typical Ziegler-Natta catalysis processes are quite useful for many applications, there are materials produced by Ziegler-Natta catalysis which have alluring properties but which have significant shortcomings.

SUMMARY OF THE INVENTION

Structures which include polymers produced by Ziegler-Natta catalysis are made by a process which significantly increases the control over the handling of these materials. In the inventive process, the polymer produced by Ziegler-Natta catalysis is formed in the presence of a host polymer having an electrophilic moiety (or moieties), e.g., functional groups such as aldehyde, ketone and/or epoxy groups, that react, through nucleophilic attack by the metal alkyls or metal alkenyls (the products of Ziegler-Natta catalysis) on the electrophilic group of the host polymer, to produce a carbon-carbon bond. (For purposes of this description such electrophilic groups will be denominated grafting sites.) The presence of these electrophilic groups causes a graft polymerization to occur. The polymer being produced by Ziegler-Natta cataysis grafts onto a host polymer containing the graft site(s).

The resulting graft polymers are in themselves useful for applications such as molded structures, or they are employed as intermediates for the production of structures, e.g., devices, containing these graft polymers or polymers derived from them. For example, in the case of polyacetylene, a soluble host polymer having at least one functional group such as a

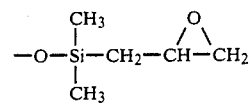

group attached to the host polymer through, for example, a C—O—Si bond, is employed. The polyacetylene, as it is formed, reacts with the epoxy moiety of this host polymer. The resulting soluble graft polymer is then contacted with a metal substrate. The polyacetylene portion of the graft polymer is selectively attracted to the metal surface. The bond of the polyacetylene to the host polymer is then broken without affecting the polyacetylene/metal interaction through the reaction

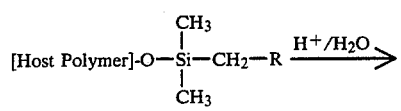

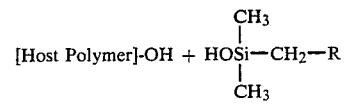

where R is the growing polyacetylene chain which reacted with the host polymer. Thus, polyacetylene containing a silicon atom—a moiety which essentially does not affect the polymer properties—remains on the substrate. These polyacetylene coatings are quite thin, uniform and reproducibly produced. A device is then easily fabricated from these thin films. For example, the polyacetylene film is formed on an aluminum substrate. The polyacetylene/aluminum interface forms a Schottky barrier which is useful in applications such as photovoltaic uses.

BRIEF DESCRIPTION OF THE DRAWING

The FIGURE is illustrative of devices of the invention.

DETAILED DESCRIPTION

The production of the inventive graft polymers and the simplified production of bodies containing these graft polymers and polymers derived from them are achieved by utilizing a graft polymerization process. In this process, a reaction mixture is formed by combining (1) a host polymer, (2) a monomer or combination of monomers which undergoes Ziegler-Natta catalysis, and (3) a Ziegler-Natta catalyst. (If the growing Ziegler-Natta polymer does not undergo rapid termination, it is possible to add the host polymer to the reaction mixture after initiation of the reaction. However, if termination is rapid, i.e., significantly faster than the time required to add and disperse the host polymer in the reaction system, delayed addition is undesirable since reaction with the host polymer is precluded by the prior termination of the growing polymer.) As previously discussed, a wide variety of monomers undergo Ziegler-Natta polymerization. For example, an extensive listing of such unsaturated monomers, e.g., olefinic monomers, and suitable corresponding catalysts are found in Boor, supra. It is generally desirable to utilize monomers which are substituted or unsubstituted lower alkenyls or alkynyls. (Substituents such as methyl or phenyl are typical.) Generally, it is preferred that these monomers have less than 15, most preferably less than 10, carbon atoms. Monomers having a larger number of carbon atoms are typically undesirable since polymerization rates often substantially decrease and termination rates substantially increase resulting in low molecular-weight products with degraded properties. Additionally, substituted alkenyls and substituted alkynyls are also useful provided the substituents (1) do not substantially reduce the reactivity of the monomers towards Ziegler-Natta catalysis, (2) do not substantially react with the host polymer and (3) do, upon polymerization, react with the host polymer to yield a graft polymer.

The host polymer present during Ziegler-Natta polymerization of the monomer should contain graft site(s) such as aldehyde, ketone, epoxy group(s) or a combination of these groups. The number of graft sites in the host polymer is not critical. However, the number of graft sites does affect the ultimate molecular weight of the polymerized monomer. In particular, the molecular weight of the polymerized monomer is approximately given by the expression $$M_n = \frac{[M]}{[GS]} \frac{K_p}{K_t} \quad (1)$$

where $M_n$ is the molecular weight, $K_p$ is the rate constant for polymerization, $K_t$ is the rate constant of polymerization termination by reaction with the graft sites, [GS] is the concentration of graft sites in the reaction mixture, and [M] is the concentration of the monomer in the reaction mixture. The fraction $K_p/K_t$ is a constant for a given temperature. Therefore, the molecular weight depends primarily on the concentration of monomer and on the concentration of graft sites present in the solution. As a result, the molecular weight obtained is controllable through the choice of an appropriate monomer concentration and an appropriate graft site group concentration. A controlled sample is easily utilized to determine the most appropriate concentrations for a desired molecular weight.

The use of host polymers having epoxy groups is particularly effective. For example, host polymers having double bonds (e.g., polybutadiene, polyisoprene and copolymers of styrene and butadiene) which have been treated by epoxidizing reagents such as m-chloroperbenzoic acid to form epoxy groups are utilized. Alternatively, other graft sites such as carbonyls, e.g., ketones, are useful and are easily produced, for example, by oxidizing polymers such as polyisoprene and polybutadiene. As previously discussed, the number of graft sites per polymer and the concentration of that polymer in the reaction mixture significantly affects the molecular weight. It also should be noted that too high a concentration of graft sites (e.g., a concentration greater than 20 percent of the carbon atoms of the host polymers having graft sites) is usually not desirable, although not precluded, because the product obtained generally is not reproducible and varies significantly from reaction run to reaction run. An alternative to production of graft sites by oxidation, is the expedient of attaching the graft sites, e.g., carbonyl groups through a reaction with a precursor to the host polymer. For example, an isoprene polymer having OH group(s), e.g., a terminal OH group(s), is prepared by reactions such as described in M. Szwarc, *Carbanions, Living Polymers and Electron Transfer Processes,* New York: Interscience, 1968. These OH group(s) are then reacted with a material such as

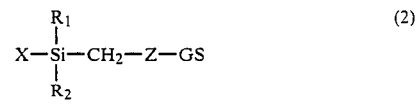

(where X is a halogen, $R_1$ and $R_2$ individually are alkyls or aryls, Z is an optical spacer group such as a lower alkyl or phenyl, and GS is (1) a graft site or (2) a precursor to a graft site, e.g., a vinyl group, which is readily convertible to graft site(s) such as epoxy graft site(s)) to form the polymer

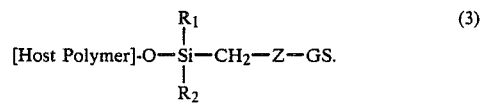

It is possible to choose $R_1$, $R_2$, and Z to fashion the strength, i.e., the chemical stability toward cleavage, of the Si—O bond to the desired application. A wide variety of choices for $R_1$, $R_2$, and Z are outlined in I. Fleming, *Comprehensive Organic Chemistry,* Barton and Ollis, eds., Vol. 3, page 539 (Pergamon Press: Oxford, England, 1979) and in G. M. Rutobbemin, *Journal of Organometallic Chemistry Library,* 11, 1384, (1981). Additionally, precursors to a graft site are useful when the graft site itself might prevent reactions of the equation (2) compound with the OH moiety, e.g., epoxies react with alkyl silyl halides. When a graft site precursor is employed, the reaction, to produce a graft site by reaction with the compounds of equation (2), is easily accomplished at room temperature in common solvents such as tetrahydrofuran in the presence of a base such as pyridine or triethylamine. The resulting host polymer has the advantage that the silicon-oxygen bond is easily broken after graft polymerization by, for example, utilizing a simple reaction with a dilute acid in the presence of water or by use of fluoride ions in tetrahydrofuran. (See Fleming, supra, 539.) Thus it is possible, when desired, to liberate the polymerized material from the host polymer.

The graft polymerization reaction is generally done at temperatures in the range −100 degrees C. to 100 degrees C. The range of most advantageous temperatures varies with the particular monomer(s) being employed. The temperature influences molecular weight and a control sample is employed to determine a suitable temperature in combination with reactant concentration to yield the desired molecular weight. For polymerization of acetylene, generally, the cis polymer grafted onto the host polymer is initially obtained. However, upon warming to room temperature almost complete conversion to the trans polymer occurs provided the graft copolymer remains in solution.

The molecular weight of the host polymer does not substantially affect the polymerization process. However, the molecular weight of the host polymer does affect properties of the final graft polymer and is chosen to produce the desired properties. For example, to obtain a soluble graft polymer product with polyacetylene, the host polymer is chosen to yield the desired solubility properties, e.g., isoprene having a molecular weight at least approximately 4 times that of the grafted acetylene per molecule is employed to produce a graft copolymer which is soluble in typical organic solvents, e.g., toluene, hexane, and benzene. The molecular weight of the host polymer also influences subsequent processing conditions. For example, it is desirable in many situations such as in device fabrication to break the bond between the host polymer and the newly polymerized material. A preferred technique for accomplishing this result is to contact the polymerization product with a substrate which preferentially attracts the Ziegler-Natta polymer portion of the graft polymer. Generally, a phase separation occurs at nominal temperatures and pressures so that only the grafted polymerization product with its host polymer is attracted to the substrate. The remaining unreacted host polymer and graft polymer is easily removed utilizing a solvent for the graft polymer. A bond cleavage between the host polymer and the Ziegler-Natta polymer is effected as previously discussed.

In the case of the polymerization of polymers, such as polyacetylene, the use of bond cleavage such as silicon-bond cleavage allows the fabrication of useful devices. For example, as previously discussed, a host polymer including a silicon-oxygen bond which has been grafted with polyacetylene is subjected to a metal substrate, 1 in the FIGURE. The acetylene portion of the graft polymer is attracted and attaches to the metal, thus producing a layer of graft polymer on the substrate surface. The silicon-oxygen bond is then broken utilizing a reagent such as a dilute acid in the presence of water and the disengaged host polymer is removed utilizing conventional solvents. The resulting metal which is coated with polyacetylene, 2 in the FIGURE, is useful in producing devices. For example, if the metal is aluminum, a rectifying junction is formed. After making electrical contact to the metal through conventional techniques such as evaporating a gold layer onto it, and after making a contact to the polyacetylene by conventional techniques such as metal evaporation or conductive paint, e.g., carbon black based epoxy or silver-filled epoxy and contacting this conductive portion with an electrical lead, 3, a useful photovoltaic device is obtained.

The following examples are illustrative of the subject invention.

EXAMPLE 1

Preparation of Host Polymers

A. Epoxidation of polyisoprene

To a 500 ml flask, with a stir bar, was added 300 ml of toluene, and 10.6 g of polyisoprene prepared by anionic polymerization (Mw/Mn of approximately 1.04 and Mn of approximately 100,000 g/Mol). After the polymer had dissolved, 0.2 g of 85 percent m-chloroperbenzoic acid (15 percent benzoic acid) dissolved in 15 ml of toluene was added in one portion. After 6 hours, the solution was washed twice with 10 percent aqueous NaHCO$_3$ solution and subsequently three times with distilled water. The polymer was then precipitated in methanol, dried under vacuum, and stored under helium.

B. Epoxidation of poly(styrene-co-butadiene)

A random copolymer, containing 3 wt percent of polybutadiene and 97 percent styrene was prepared by techniques described in Szwarc, supra. The copolymer had a molecular weight of approximately 200,000 g/Mol. Approximately 10 g of the copolymer was dissolved in 200 ml of toluene. To this solution was added 0.15 g of 85 percent m-chloroperbenzoic acid. The mixture was stored for 48 hours. The mixture was then washed twice with 10 percent aqueous NaHCO$_3$ and three times with distilled water. The polymer was precipitated into MeOH, and was dried under vacuum at 110 degrees C. for 12 hours. The polymer was stored under helium prior to use.

C. Preparation of ketone terminated polystyrene

Polystyrene (molecular weight of approximately 100,000 g/Mol) was prepared in benzene by the anionic polymerization methods described in Szwarc, supra. A fivefold molar excess of acetylchloride was added in one portion to the polystyryl anion prepared by anionic polymerization to give a mixture including methyl ketone, end-capped polystyrene. The polymer was precipitated into methanol. The polymer was dried under vacuum at 110 degrees C. and stored under helium prior to use.

D. Air oxidation of polyisoprene

Polyisoprene (molecular weight of approximately 200,000 g/Mol) was prepared by the methods described in Szwarc, supra. The polymer was stored in the dark in air for four years at zero degrees C. Analysis by infrared spectroscopy revealed the presence of aldehydes and ketones as oxidation products.

EXAMPLE 2

Preparation of Graft Polymers

A. Preparation of polyacetylene-polyisoprene graft copolymer

In an oxygen-free dry box 1.0 g of epoxidized polyisoprene prepared as described in Example 1 was added to a 50 ml round bottom flask containing a magnetic stir bar. Approximately 10 ml of dry deoxygenated toluene was added and the flask was sealed with a reactor head having two stopcocks. One stopcock was used as a gas inlet and the other was equipped with a septum for introducing liquids. The flask was removed from the dry box and was connected to a vacuum line. After the polyisoprene had dissolved and the connecting gas line had been purged, approximately 100 μl of a 0.13M solution of titanium tetra-n-butoxide in toluene was added with stirring to the solution. The flask was cooled in an acetone-dry ice bath and evacuated to a pressure of 50 mTorr. After back-filling the flask with purified acetylene, about 30 μl of a 25 wt percent solution of triethylaluminum in toluene was added dropwise. The cold bath was removed. The polymer solution became pink and then rapidly darkened to a deep burgundy (characteristic of cis polyacetylene). As the flask warmed, the color changed to violet and finally a dark blue (characteristic of trans polyacetylene). The final product was nearly opaque and had a polyacetylene graft copolymer content of approximately 5 wt percent based on polyisoprene. The product was transferred to a dry box.

B. Polyisoprene-Polyacetylene graft copolymer

A catalyst mixture was prepared by combining (1) 10 ml of a 1.134M solution of titanium tetra-n-butoxide in toluene and (2) 2.7 ml of a 25 wt percent solution of triethylaluminum in toluene. The catalyst mixture was cooled in a dry ice/acetone bath for 1 hour under an inert gas atmosphere prior to use.

To the reactor described in part A was added (1) 2.0 g of mildly oxidized polyisoprene prepared as described in Example 1D and (2) 20 ml of dry deoxygenated toluene. When the polymer had dissolved, the reactor was cooled in a dry ice acetone cold bath and evacuated to less than 100 mTorr. The reactor was then back-filled with purified acetylene. The solution was warmed to room temperature and 0.25 ml of the previously prepared catalyst solution was added. A dark blue solution formed almost immediately becoming nearly opaque in less than 10 minutes. The product had a polyacetylene graft copolymer content after filtration of approximately 5 percent by weight based on total polymer.

C. Polyacetylene-ketone terminated polystyrene

The procedure of Example 2A was performed except the host polymer of Example 1C was employed instead of the polyisoprene host polymer.

D. Polyacetylene-poly(styrene-co-butadiene)

The procedure of Example 2A was performed except the host polymer of Example 1B was employed instead of the polyisoprene.

EXAMPLE 3

Adsorption of Polyacetylene Graft Copolymers to Active Surfaces

A standard germanium crystal designed for use in attenuated total internal reflectance (ATR) spectroscopy was coated with gold by a conventional vapor deposition procedure to a statistical thickness of 1 to 2 nm. The crystal was transferred to a dry box where several drops of a toluene solution of a soluble polyacetylene-polyisoprene graft copolymer (prepared in Example 2B) was allowed to dry on the surface. The crystal was immersed in toluene for 2 hours to wash the excess graft copolymer from the surface. After a second wash in toluene the crystal was dried in a vacuum and the adsorbed layer was examined by ATR infrared spectroscopy. The adsorbed layer was found to be a thin, approximately 10 nm, layer of adsorbed polyacetylene with an overregion of the host polymer.

What is claimed is:

1. A process of polymerization comprising the steps of polymerizing a composition comprising a monomer having an unsaturated bond with a Ziegler-Natta catalyst characterized in that a host polymer is contacted with said polymerizing composition at a time which allows the reaction of said host polymer with said polymerizing monomer before the completion of said polymerization wherein said host polymer includes a graft site that comprises an electrophilic moiety that reacts through nucleophilic attack with said polymerizing monomer, wherein said electrophilic moiety comprises a carbonyl or an epoxy group.

2. The process of claim 1 wherein said host polymer comprises a member chosen from the group consisting of the polyisoprene, polybutadiene, and poly(styrene-co-butadiene).

3. The process of claim 2 wherein said monomer comprises acetylene.

4. The process of claim 1 wherein said monomer comprises acetylene.

5. The process of claim 1 wherein said graft site comprises a functional group chosen from the group consisting of ketones, aldehydes, and epoxies.

6. The process of claim 1 wherein said graft polymer includes a cleavable bond.

7. The process of claim 1 wherein said cleavable bond is Si—O bond.

8. The process of claim 1 including the step of contacting said graft polymer with a metal substrate.

9. The process of claim 8 wherein said polymerized monomer is cleaved from said host polymer.

10. The process of claim 1 including the step of cleaving said polymerized monomer from said host polymer of said graft polymer.

* * * * *